(12) United States Patent
Igawa et al.

(10) Patent No.: US 6,517,099 B2
(45) Date of Patent: Feb. 11, 2003

(54) AIRBAG MODULE WITH HORN SWITCH

(75) Inventors: Tadahiro Igawa, Tokyo (JP); Masahiro Hasebe, Tokyo (JP); Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/843,644

(22) Filed: Apr. 27, 2001

(65) Prior Publication Data

US 2001/0054809 A1 Dec. 27, 2001

Related U.S. Application Data

(60) Provisional application No. 60/208,054, filed on May 31, 2000.

(51) Int. Cl.[7] ............................................... B60R 21/16
(52) U.S. Cl. ................................. 280/728.2; 280/728.3; 280/731
(58) Field of Search .............................. 280/731, 728.3, 280/728.2; 200/61.54, 61.55

(56) References Cited

U.S. PATENT DOCUMENTS 6,199,899 B1 * 3/2001 Krebs et al. ............. 280/728.2
6,244,618 B1 * 6/2001 Yokota .................... 280/728.2

FOREIGN PATENT DOCUMENTS

JP 11-297155 10/1999

\* cited by examiner

*Primary Examiner*—Eric Culbreth
(74) *Attorney, Agent, or Firm*—Foley & Lardner

(57) ABSTRACT

An air bag device is provided comprising an air bag, a retainer to which the air bag is mounted, a module cover covering the air bag, a protruding member protruding from the module cover towards the retainer, and a restricting member positioned along the outer side of the protruding member. The restricting member restricts displacement of the module cover during air bag inflation.

7 Claims, 5 Drawing Sheets

AIRBAG MODULE WITH HORN SWITCH

CROSS REFERENCE TO RELATED APPLICATIONS

The present application claims priority to and the benefit of U.S. Provisional Patent Application Ser. No. 60/208,054 filed May 31, 2000. The foregoing provisional application is incorporated by reference herein in its entirety.

BACKGROUND OF THE INVENTION

The present invention relates to an air bag device comprising a horn switch, and, more particularly, to an air bag device which is constructed so that, when a module cover is pushed, only a module cover moves so as to turn on the horn switch.

There is a type of driver-seat air bag device installed at the steering wheel of an automobile, which is constructed so that, when a module cover of the air bag device is pushed, a horn switch is turned on in order to blow a horn. In this case, when the air bag device is constructed so that only the module cover, and not the entire air bag device, moves to turn on the horn switch, only a small amount of pushing force is required to turn on the horn switch.

An airbag apparatus 100 having such a structure is shown in FIG. 7. The airbag apparatus 100 comprises a retainer 102, an airbag 106 attached to the retainer 102 with an airbag fitting ring 104, an inflator 108 for inflating the airbag 106, and a module cover 110 for covering the folded airbag 106.

An integral leg section 112 protrudes from the back side of the module cover 110, and hooks 116 of a side-wall section 114 which is bent forward from the retainer 102 are inserted through openings 118 in the leg section 112. Each hook 116 outwardly protrudes from the sidewall section 114 in an L-shape.

The inflator 108 includes a flange 108a. Bolts 120 protruding from the ring 104 are inserted through the retainer 102 and the flange 108a, so that the inflator 108 is fixed to the retainer 102 together with the airbag 106 by tightening nuts 122.

The shape of the folded airbag 106 is maintained by a shape holding member 124. The shape holding member 124 allows the airbag 106 to expand by breaking-off or deforming when the airbag 106 is inflated.

A bracket 132 protrudes upwardly from a steering wheel 130, and projecting pieces 134 protruding downward from the backside of the retainer 102. The pieces 134 are fixed to the bracket 132 with bolts 136 and nuts 138.

A predetermined sized gap is formed between the back face of the module cover 110 and the shape holding member 124. A predetermined sized gap is also formed between the opening 118 formed on the leg section 112 of the module cover 110 and the hook 116. As a result, the module cover 110 can be moved vertically. When the module cover 110 is pressed, a horn switch (not shown) is pressed so as to be turned on. The horn switch is integrally formed with the retainer 102 and attached to an extending portion extending from the retainer 102.

In the driver-seat air bag device, when the inflator is actuated to inflate the airbag, the module cover is torn along a tear line due to the force applied from the inflating airbag. Then, a large force is exerted on the module cover in the direction in which the module cover is separated from the retainer.

In a conventional air bag device which has its module cover firmly secured to its retainer, the module cover does not separate away from the retainer. However, in an air bag device which is constructed so that the module cover moves in a direction in which it comes into contact with and separates from the retainer, the hook 116 may get dislodged from the opening 118 of the leg 112 of the module cover.

SUMMARY OF THE INVENTION

The present invention is directed to overcoming or at least reducing the effects of one or more of the problems set forth above.

Accordingly, it is an object of the present invention to provide an air bag device which makes it possible to reliably retain a module cover by a retainer during the expansion of an air bag (that is, during the operation of an inflator), when the air bag device is of a type whose module cover can move in a direction in which it comes into contact with and separates from the retainer.

According to the present invention, there is provided an air bag device comprising an air bag; a retainer to which the air bag is mounted; a module cover which covers the air bag, the module cover being movable towards the retainer; a wall projected from the retainer; a leg projected downwardly from an underside of the module cover; an opening formed in the leg; and a hook protruded from the wall, the hook extending into the opening; wherein the opening and the hook are separated by a space which allows movement of the module cover; and wherein a restricting member for restricting the movement of the leg in a direction in which the leg separates away from the wall is provided at the retainer.

In such an air bag device, in the case where the module cover is torn followed by operating the inflator, even when the leg of the module cover tries to separate away from the wall of the retainer, the restricting member prevents the separation of the module cover away from the wall of the retainer. Therefore, the hook is not dislodged from the opening in the leg at all.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
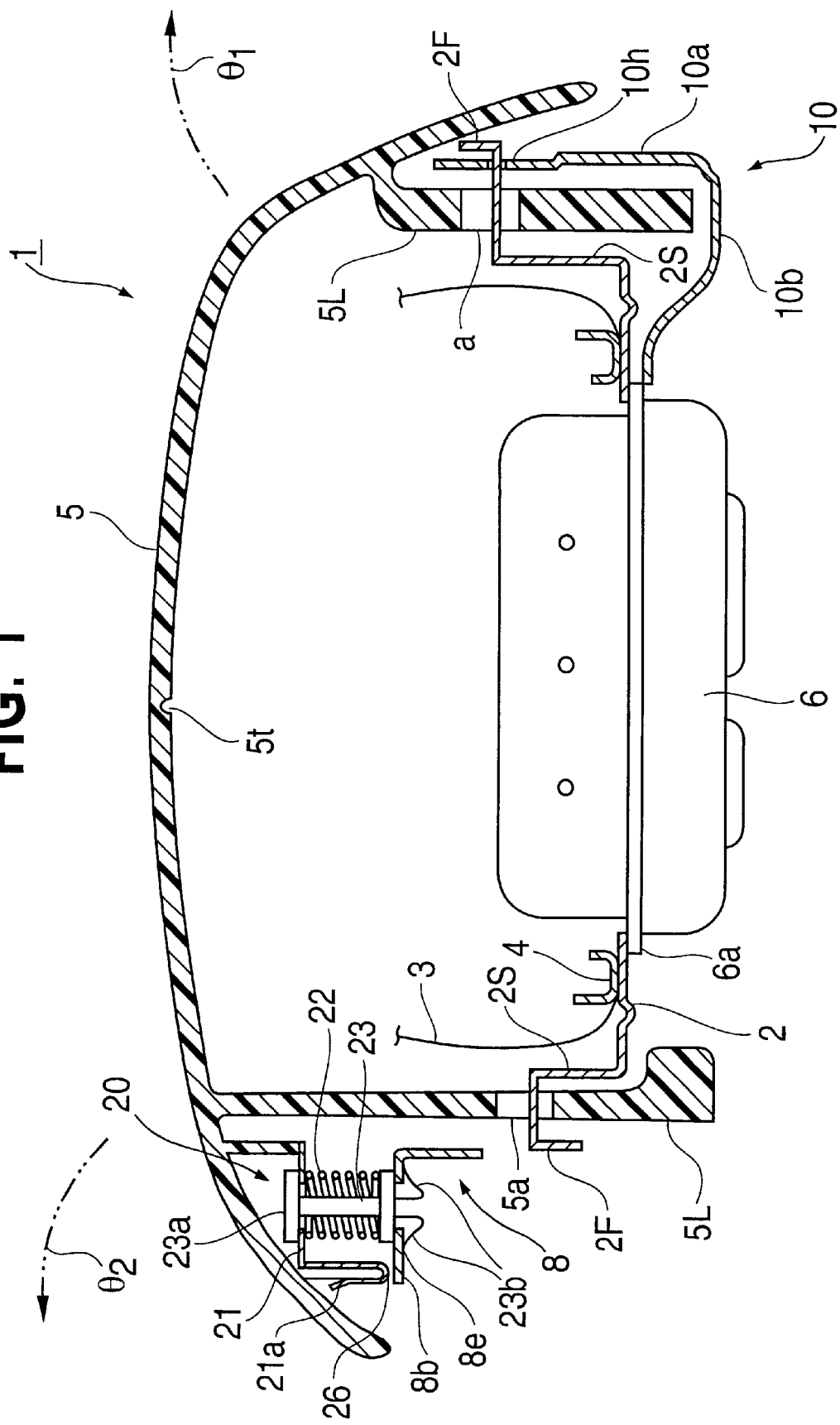
FIG. 1 is a sectional view of an air bag device according to the present invention.

According to the present invention, as shown in FIG. 1, for example, the air bag device 1 comprises a retainer 2, an air bag 3 which is mounted to the retainer 2 by an air bag mounting ring 4, an inflator 6 for inflating the air bag 3, and a module cover 5 which covers the air bag 3 which is folded. The module cover 5 has a tear line 5*t*. When the air bag 3 is inflated by the inflator 6, the module cover 5 is torn along the tear line 5*t*. The air bag 3 which is folded has its shape retained by a shape retaining member (not shown).

A leg 5L is integrally provided on the underside of the module cover 5 so as to protrude therefrom. A hook 2F of a side wall 2S, which is bent forwardly from the retainer 2, is inserted in an opening 5*a* of the leg 5L. The hook 2F is an L-shaped hook which is provided so as to protrude outwardly from the side wall 2S.

The leg 5L is disposed so as to oppose the outer side of the side wall 2S and so as to be separated by a predetermined space therefrom. A restricting member 10 for restricting the separation of the leg 5L away from the side wall 2S is provided along the outer side of the leg 5L.

Figure 2:
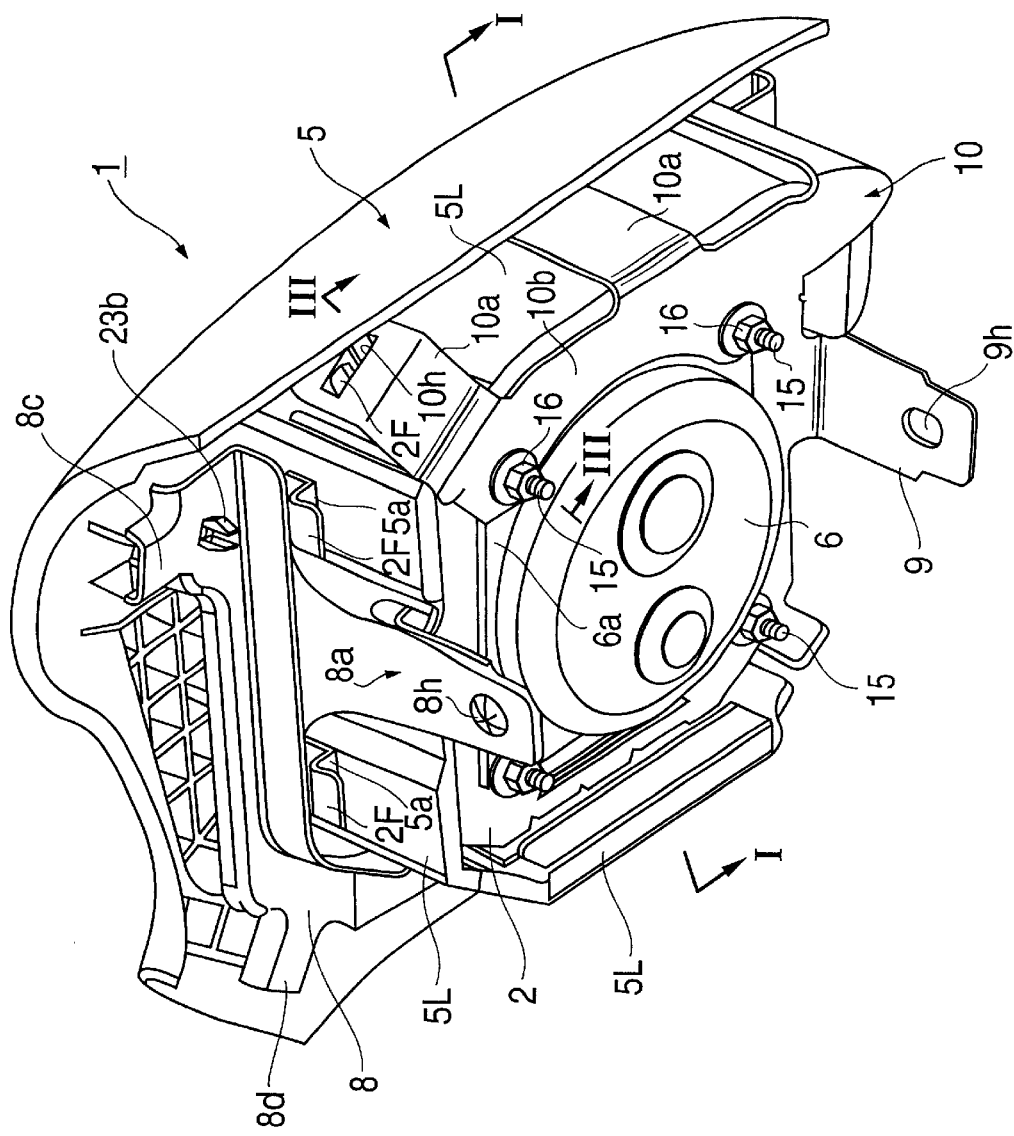
FIG. 2 is a perspective view of an air bag device according to the present invention.
Figure 3:
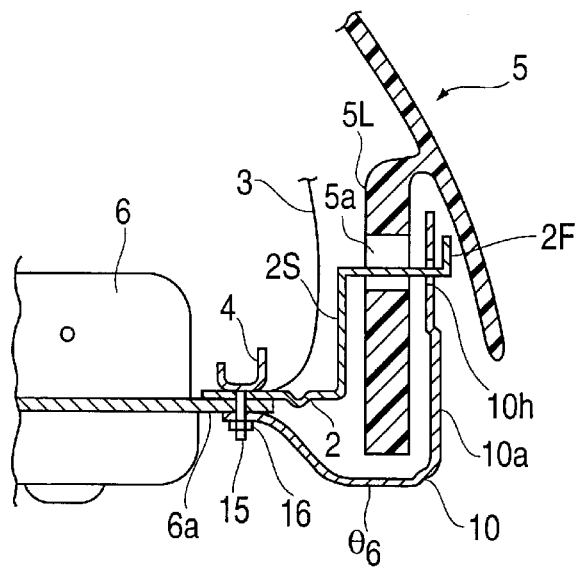
FIG. 3 is a sectional view of an air bag device according to the present invention taken along line III—III of FIG. 2.

The restricting member 10 comprises a standing wall 10*a* which opposes the outer side of the leg 5L so as to be separated by a predetermined space therefrom, and a bottom portion 10*b* which extends around the bottom side of the retainer 2. An opening 10*h* is formed in the standing wall 10*a* in order to receive the hook 2F. The restricting member 10 and the retainer 2 are connected together at the opening 10*h*, as shown in FIG. 1, to form a closed loop around the leg 5L of the module cover 5. As shown in FIG. 2, holes for inserting bolts 15 are provided in the bottom portion 10*b* of the restricting member.

The inflator 6 has a flange 6*a*. The bolts 15 protruding from the ring 4 are passed through the retainer 2 and the flange 6*a*, and are engaged with nuts 16, thereby securing the inflator 6 to the air bag 3 and the retainer 2.

As shown in FIG. 2, some of the bolts 15 pass through the bottom portion 10*b* of the restricting member 10, and the corresponding nuts 16 are engaged thereon in order to secure the restricting member 10 to the retainer 2.

Figure 4:
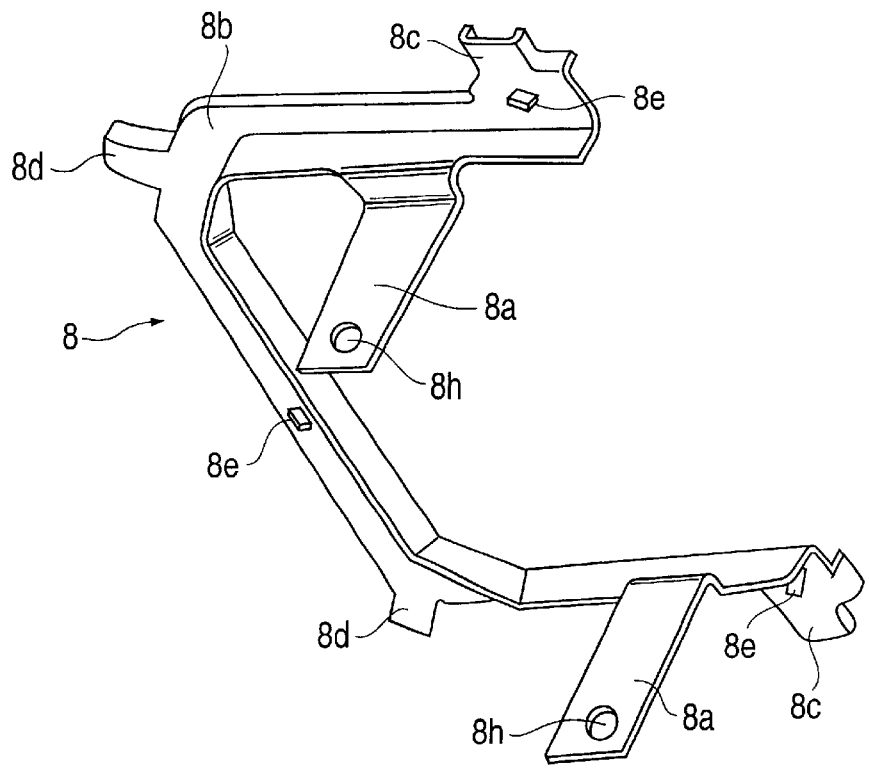
FIG. 4 is a perspective view of a horn switch supporting member according to the present invention.
Figure 5:
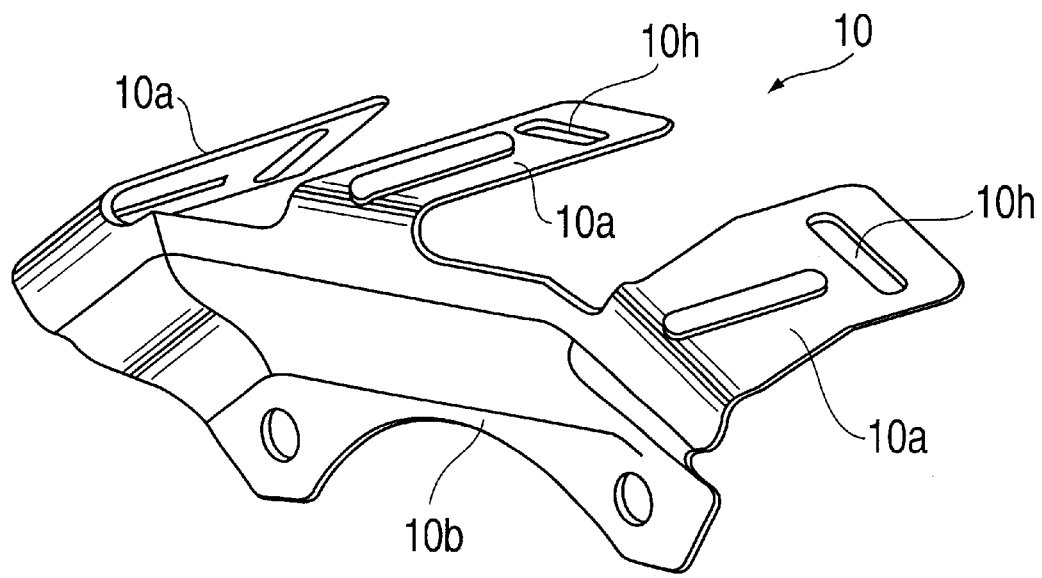
FIG. 5 is a perspective view of a restricting member according to the present invention.
Figure 6:
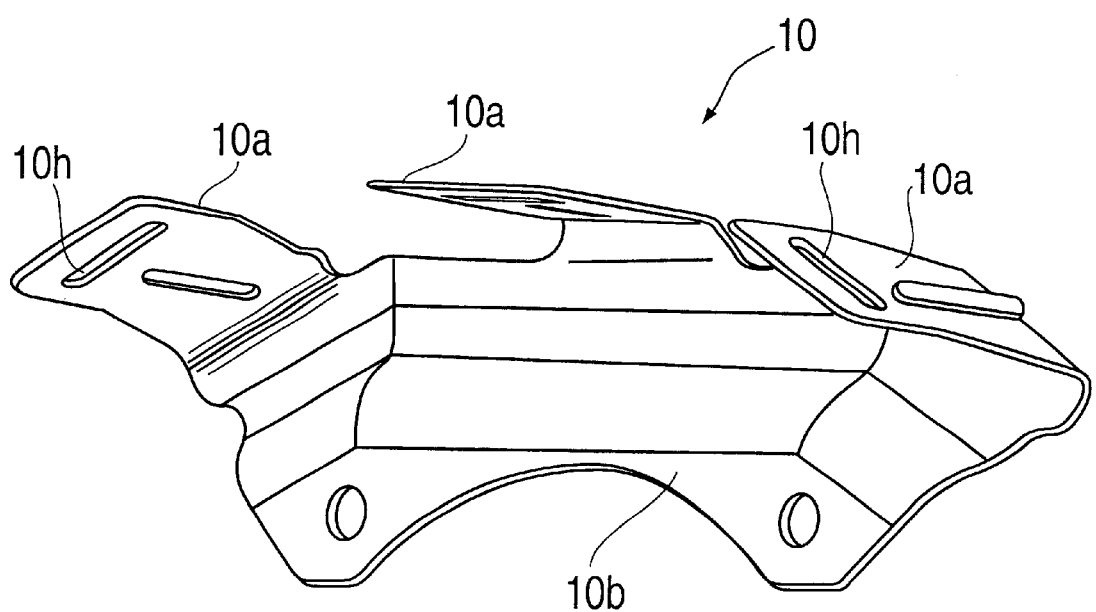
FIG. 6 is a perspective view of a restricting member according to the present invention as viewed from a direction which is different from the direction from which the restricting member is viewed in FIG. 5.
Figure 7:
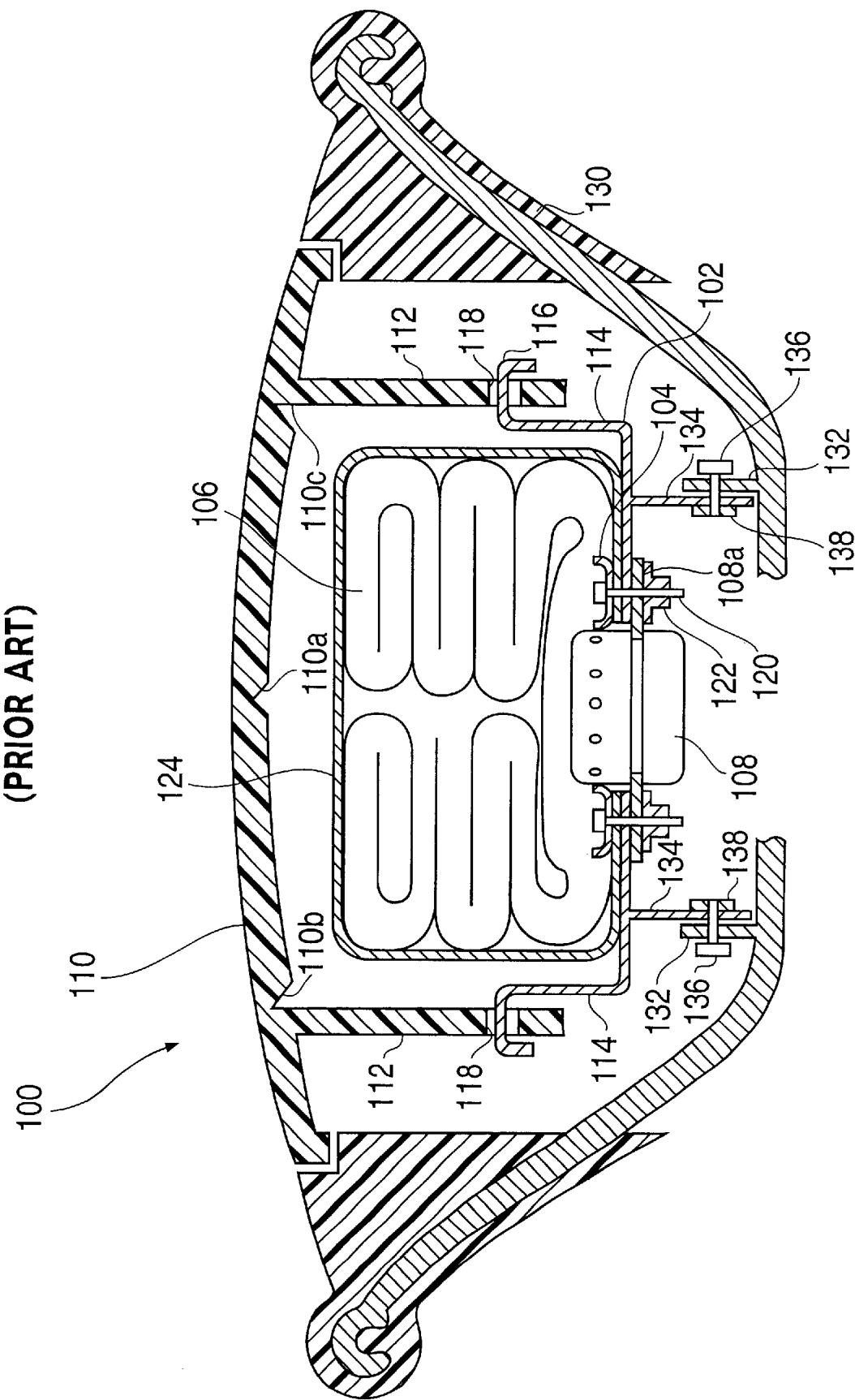
FIG. 7 is a sectional view of a floating module cover type air bag device.

As shown in FIG. 2, bases 8*a* of a horn switch supporting member 8 and a protrusion 9 protrude downward from the back surface of the retainer 2 are secured to a bracket (not shown) of a steering wheel by a bolt. As shown in FIG. 4, the horn switch supporting member 8 has a U shape which allows it to surround three sides of the retainer 2, and a top portion 8*b* thereof faces the back side surface of the peripheral portion of the module cover 5 and extends in a direction perpendicular to the direction in which the module cover 5 advances and retreats.

Extending portions 8*c* and extending portions 8*d* extend in a protruding manner from the top portion 8*b*, with the extending portions 8*c* extending towards the left and right of the steering wheel (that is, towards the left and right relative to the steering wheel in the position where the automobile is advancing straight). Similarly, extending portions 8*d* extend towards the bottom left and bottom right of the steering wheel. Ends of the extending portions 8*d* in the direction of extension engage a step of the steering wheel.

As shown in FIG. 1, a horn switch 20 is provided between the extending portions 8*c* (FIG. 4) and the module cover 5 as described below. The horn switch 20 is also provided midway between the extending portions 8*d* (FIG. 4). Reference numerals 8*e* and 8*e* (FIG. 4) denote openings used for mounting the horn switch 20.

As shown in FIG. 2, the horn switch supporting member 8 is disposed along the left and right sides and the bottom side of the retainer 2. The bases 8*a* are provided so as to extend along the left and right sides of the retainer 2.

Openings 8*h* and 9*h* for inserting a bolt are formed in the base portions 8*a* and the protrusion 9, respectively. This bolt is screwed into an internally threaded hole formed in the bracket.

The shape retaining member (not shown) for retaining the shape of the air bag 3 and the module cover 5 are separated by a predetermined space. The edge of the opening 5*a* formed in the leg 5L of the module cover 5 and the hook 2F are separated by a predetermined space in order to allow the module cover 5 to move upward and downward in FIG. 1. When the module cover 5 is pushed, the horn switch 20 is pushed and turned on.

The horn switch 20 comprises a contact member 21, a coil spring 22, and a spring guide 23 which is externally fitted to the coil spring 22. The contact member 21 comprises a clip portion 21*a* fitted to a rib protruded from the back surface of the module cover 5.

The contact member 21 includes a contact 26 which is a protrusion and engages with a head 23*a* of the guide 23. When the module cover 5 is pushed, the contact 26 comes into contact with the top portion 8*b* of the horn switch supporting member 8, causing the horn switch 20 to turn on in order to blow a horn.

In the spring guide 23, the head 23*a* is engaged into the contact member 21, and a pair of resilient legs 23*b* provided at the base end side are engaged into the openings 8*e* of the top portion 8*b* of the horn switch supporting member 8.

In the air bag device 1 having such a structure, when the module cover 5 is pushed, only the module cover 5 retreats, causing the horn switch 20 to turn on, so that the horn blows.

When, for example, an automobile collides, the inflator 6 operates to eject gas in order to inflate the air bag 3. The module cover 5 is torn along the tear line 5*t*, then the air bag 3 inflates inside the vehicle and protects a passenger.

During this time, the module cover 5 curves in the directions θ1 and θ2 as shown in FIG. 1, resulting in applying a force near the opening 5*a* of the leg 5L in the direction in which it separates away from the side wall 2S of the retainer 2. However, since the standing wall 10*a* of the restricting member 10 is disposed along the outer side of the leg 5L, the separation of the leg 5L away from the side wall 2S is restricted when the module cover 5 rotates in the direction θ1. Therefore, the hook 2F does not separate away from the opening 5*a*, whereby the module cover 5 is reliably retained by the retainer 2.

The horn switch supporting member 8 is disposed along the outer side of the leg 5L, at the left side of FIG. 1 in order to prevent the leg 5L at the left side in FIG. 1 from separating away from the side wall 2S when the module cover 5 rotates in the direction θ2. This prevents the hook 2F at the left side in FIG. 1 from separating away from the opening 5*a* of the leg 5L. Therefore, the horn switch supporting member 8 also serves as a restricting member.

As described above, the air bag device of the present invention which is constructed so that the module cover floats in order to turn on the horn switch makes it possible to reliably retain the module cover by the retainer even during the inflation of the air bag.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An air bag device comprising:

an air bag;

a retainer to which the air bag is mounted;

a module cover which covers the air bag, the module cover being movable towards the retainer;

a wall projected from the retainer;

a leg projected from an underside of the module cover;

an opening formed in the leg; and a hook protruded from the wall, the hook extending into the opening;

wherein the opening and the hook are separated by a space which allows movement of the module cover; and a restricting member that engages the hook for restricting the movement of the leg in a direction in which the leg separates away from the wall.

2. An air bag device comprising:

an air bag;

a retainer to which the air bag is mounted;

a module cover covering said air bag, and including an opening for receiving a portion of the retainer, wherein the module cover is configured to move independently from the retainer; and a restricting member attached to the retainer to form a closed loop around a portion of the module cover, wherein the closed loop passes through the opening with sufficient clearance to allow for movement of the module cover independent from the retainer and the restricting member.

3. The device of claim 2, wherein the retainer comprises at least two hooks positioned on the retainer, and wherein the module cover comprises at least two openings, and wherein each of said at least two hooks are disposed within one of said at least two openings.

4. The device of claim 2, wherein the restricting member is connected to the retainer at two locations.

5. The device of claim 2, further comprising an inflator connected to the retainer.

6. The device of claim 2, further comprising a horn switch configured to be activated by movement of the module cover.

7. An air bag apparatus, comprising:

an air bag mounted on a retainer;

a module cover covering said air bag;

a horn switch configured to be activated by movement of the module cover;

wherein said retainer comprises a hook engaged with the module cover so that there is a space between the hook and the module cover so that the module cover is allowed to move to activate the horn switch; and a restricting member connected to the hook to maintain the hook engaged with the module cover.

* * * * *